United States Patent [19]
Forster et al.

[11] Patent Number: 5,580,502
[45] Date of Patent: Dec. 3, 1996

[54] METHOD OF FABRICATING A COMPOSITE ARTICLE HAVING AN INTEGRAL, CO-CURED COMPOSITE STIFFENING MEMBER

[75] Inventors: William V. Forster, Seymour; Patrick L. Riley, Hamden, both of Conn.

[73] Assignee: Sikorsky Aircraft Corporation, Stratford, Conn.

[21] Appl. No.: 410,270

[22] Filed: Mar. 23, 1995

[51] Int. Cl.⁶ .............................. B29C 44/06; B29C 44/12
[52] U.S. Cl. .................... 264/46.5; 264/46.7; 264/257; 264/258; 264/321; 428/117
[58] Field of Search .................. 264/46.7, 257, 264/258, 321, 46.5; 428/117

[56] References Cited

U.S. PATENT DOCUMENTS

| | | | |
|---|---|---|---|
| 2,744,042 | 5/1956 | Pace | 264/46.7 |
| 3,873,654 | 3/1975 | Smith | 264/321 |
| 3,879,245 | 4/1975 | Fetherston et al. | 264/321 |
| 4,090,002 | 5/1978 | Rosenblum | 264/257 |
| 4,198,018 | 4/1980 | Brault | 244/119 |
| 4,620,890 | 11/1986 | Myers et al. | 156/196 |
| 4,622,091 | 11/1986 | Letterman | 264/258 |
| 4,687,691 | 8/1987 | Kay | 428/73 |
| 4,780,167 | 10/1988 | Hill | 264/321 |
| 4,917,742 | 4/1990 | Watanabe et al. | 264/46.7 |
| 4,964,936 | 10/1990 | Ferro | 264/321 |
| 5,188,879 | 2/1993 | Hill et al. | 264/321 |
| 5,238,725 | 8/1993 | Effing et al. | 428/116 |
| 5,266,249 | 11/1993 | Grimes, III et al. | 264/258 |
| 5,354,195 | 10/1994 | Dublinski et al. | 264/511 |
| 5,356,586 | 10/1994 | Dublinski et al. | 264/258 |
| 5,430,937 | 7/1995 | Leahy et al. | 29/889.6 |

Primary Examiner—Allan R. Kuhns
Attorney, Agent, or Firm—Terrance J. Radke

[57] ABSTRACT

A method for fabricating a composite article having a composite stiffening member co-cure bonded in integral combination therewith wherein the composite article comprises outer mold line (OML) and inner mold line (IML) composite skins and a modified honeycomb core interposed therebetween. The method includes a first set of steps for modifying the honeycomb core of the composite article and includes the steps of providing a detail mold that defines a detail cavity and a core engagement surface, aligning the honeycomb core with the detail mold by abuttingly engaging a first surface of the honeycomb core with the core engagement surface wherein a base segment of the honeycomb core is aligned with the detail cavity, to injecting a RIM foam to fill the detail cavity and the honeycomb cells of the base segment, and curing the injected RIM foam to form the modified honeycomb core that includes a densified base segment and a detail mandrel integral with the densified base segment. The detail mandrel is operative to define the configuration of the composite stiffening member to be co-cure bonded in integral combination with the composite article. A second set of steps includes laying up a first set of prepreg composite plies that define the OML composite skin in combination with a fabrication mold, laying up the modified honeycomb core in combination with the layed-up first prepreg composite plies, mold, laying up additional prepreg composite plies that define the IML composite skin and the composite stiffening member in combination with the modified honeycomb core and co-curing the layed-up prepreg plies to form the composite article having the composite stiffening member co-cure bonded in integral combination therewith.

9 Claims, 5 Drawing Sheets

5,580,502

METHOD OF FABRICATING A COMPOSITE ARTICLE HAVING AN INTEGRAL, CO-CURED COMPOSITE STIFFENING MEMBER

The U.S. Government has rights in this invention pursuant to Contract No. DAAJ09-91-C-A004 awarded by the Department of the Army.

TECHNICAL FIELD

This invention is directed to manufacturing methods, and more particularly, to a method for fabricating a composite article having a composite stiffening member co-cure bonded in integral combination therewith wherein the composite article comprises outer and inner composite skins and a modified honeycomb core interposed therebetween.

BACKGROUND OF THE INVENTION

There is a growing trend in the aerospace industry to expand the use of composite materials for a diverse array of structural and dynamic applications because of the strength-to-weight advantage provided by composite materials. One particular application for the use of composite materials lies in the fabrication of composite articles such as structural panels, e.g., fuselage panels, for aircraft and helicopters that include one or more stiffening members for reacting loads experienced by the structural panel. Such structural panels generally comprise inner and outer composite skins, which are formed from composite materials such as fiberglass, graphite, or KEVLAR® (KEVLAR is a registered trademark of E. I. du Pont de Nemours & Co., Wilmington, Del. for an aromatic polyamide fiber of high tensile strength) embedded in a resinous matrix, e.g., epoxy, having a honeycomb core material interposed therebetween.

A structural panel typically includes one or more stiffening members affixed to the inner wall thereof for efficiently transmitting and/or reacting axial and/or bending loads to which the structural panel is subjected. For structural panels fabricated from sheet metal, the stiffening members are affixed to the inner wall by fasteners or welding. For structural panels fabricated from composite materials, composite stiffening members are typically affixed to the inner mold line (IML) composite skin of the composite structural panel by means of fasteners or bonding. While the use of fasteners is an acceptable technique for affixing composite stiffening members to the IML composite skin of a composite structural panel, this technique is extremely labor intensive, i.e., costly and time consuming, and the rivets utilized to effect affixation increase the overall weight attributable to the composite structural panel.

There are two techniques currently employed for bonding a composite stiffening member in combination with a composite structural panel: (1) the co-cured bonding method; or (2) the secondary bonding method. Both methods are disadvantageous in requiring costly non-recurring tooling and/or costly recurring manufacturing steps as discussed in further detail in the following paragraphs. FIG. 1A illustrates the co-cure bonding method for bonding a composite stiffening member SM in combination with a composite structural panel SP that includes an inner mold line (IML) composite skin $S_{IML}$ formed from composite plies and an outer mold line (OML) composite skin $S_{OML}$ formed from composite plies and which has a honeycomb core HC interposed between the OML and IML composite skins $S_{OML}$, $S_{IML}$.

A core mandrel CM is required to stabilize the composite plies $P_{SM}$ that comprise the stiffening member SM to prevent collapse or deformation of the plies $P_{SM}$ during the co-cure cycle as a result of the co-cure pressure exerted thereagainst. Typically, the core mandrel CM is formed from a lightweight, relatively rigid (relatively rigid being used herein in the sense that the core mandrel CM will accommodate, without collapse or deformation, the pressures experienced during the co-cure cycle while concomitantly having a minimal density) material, e.g., a rigid foam such as polyurethane foam. Recurring process steps are required to machine a block of the foam material to the net shape of the core mandrel CM. To ensure exact positioning of the core mandrel CM on the IML composite skin $S_{IML}$ is maintained during the co-cure cycle, a film adhesive FM is interposed between the core mandrel CM and the IML composite skin $S_{IML}$. Recurring manufacturing steps are required to properly position the film adhesive FM on the IML composite skin $S_{IML}$ and to attach the core mandrel CM in aligned combination with the film adhesive FM. The attachment of core mandrel CM to the IML composite skin $S_{IML}$ by means of the film adhesive FM creates a slip-plane, i.e., a local weak joint or surface, along which the core mandrel CM may slide relative to the IML composite skin $S_{IML}$. This creates the need for additional recurring tooling, i.e., a bonding fixture, during the co-cure cycle to ensure that no slippage of the core mandrel CM occurs due to the co-cure pressure exerted during the co-cure cycle.

FIG. 1B illustrates the secondary bonding method for bonding a precured composite stiffening member CSM in combination with the composite plies defining the composite structural panel SP. The precured composite stiffening member CSM is fabricated in prefabrication recurring manufacturing steps using non-recurring tooling. Non-recurring autoclave tooling, i.e., an autoclave molding assembly, is required to define the configuration of the composite stiffening member CSM to be prefabricated. Recurring manufacturing steps are required to lay up composite plies defining the composite stiffening member CSM in the autoclave tooling, and to cure the layed-up autoclave tooling in an autoclave to form the precured composite stiffening member CSM. Exact positioning of the precured composite stiffening member CSM on the IML composite skin $S_{IML}$ is maintained during the fabrication curing cycle wherein the OML and IML composite skins $S_{OML}$, $S_{IML}$ are cured to form the finished composite structural panel SP by a combination of the inherent tackiness of the prepreg composite plies forming the IML composite skin $S_{IML}$ and a bonding fixture. While the secondary bonding method provides a marginal weight savings in the finished composite structural panel SP due to the elimination of the requirement for use of a core mandrel as a stabilizing member, the non-recurring tooling costs and recurring manufacturing steps required by this method, i.e., to prefabricate the composite stiffening member CSM, are more costly and/or time consuming than the non-recurring tooling costs and recurring process steps associated with the co-cure bonding method described hereinabove.

A need exists to provide a method for co-cure bonding a composite stiffening member in integral combination with a composite article that reduces the use of costly non-recurring tooling and/or reduces recurring manufacturing steps. The method should ensure the precise positioning of the composite stiffening member with respect to the honeycomb core of the composite article to be fabricated. The method should provide stabilization for the composite stiffening member during the co-cure cycle, i.e., preclude the collapse or deformation of the composite plies forming the composite stiffening member. Further, the method should provide stabilization of the honeycomb core during the co-cure cycle to preclude the collapse or deformation thereof.

DISCLOSURE OF THE INVENTION

One object of the present invention is to provide a method for co-cure bonding a composite stiffening member in integral combination with a composite article that reduces the use of non-recurring tooling and/or reduces recurring manufacturing steps.

Another object of the present invention is to provide a method for co-cure bonding of a composite stiffening member in integral combination with a composite article comprising an outer mold line (OML) composite skin and an inner mold line (IML) composite skin that has a modified honeycomb core interposed between the OML and IML composite skins wherein the modified honeycomb core is operative to ensure precise positioning of the composite stiffening member of the composite article to be fabricated.

A further object of the present invention is to provide a method for co-cure bonding of a composite stiffening member in integral combination with a composite article comprising an outer mold line (OML) composite skin and an inner mold line (IML) composite skin that has a modified honeycomb core interposed between the OML and IML composite skins wherein the modified honeycomb core is operative to stabilize the composite stiffening member during the co-cure cycle.

Yet a further object of the present invention is to provide a method for co-cure bonding of a composite stiffening member in integral combination with a composite article comprising an outer mold line (OML) composite skin and an inner mold line (IML) composite skin that has a modified honeycomb core interposed between the OML and IML composite skins wherein the modified honeycomb core is stabilized to preclude collapse or deformation thereof during the co-cure cycle.

These and other objects of the present invention are achieved by a method according to the present invention for fabricating a composite article having a composite stiffening member co-cure bonded in integral combination therewith wherein the composite article comprises outer mold line (OML) and inner mold line (IML) composite skins having a modified honeycomb core interposed therebetween. The method includes a first set of steps for modifying the honeycomb core of the composite article to be fabricated and a second set of steps for fabricating the composite article utilizing the modified honeycomb core. The first set of steps includes a step of providing a detail mold having a detail molding surface that defines a detail cavity and a core engagement surface, a step of aligning the honeycomb core with the detail mold by abutting one surface of the honeycomb core with the core engagement surface of the detail mold wherein a base segment of the honeycomb core is aligned with the detail cavity, a step of activating a reaction injection molding (RIM) apparatus to inject a RIM foam to fill the detail cavity and the honeycomb cells of the base segment, and a step of curing the injected RIM foam to form the modified honeycomb core that includes a densified base segment and a detail mandrel integral with the densified base segment. The detail mandrel defines the configuration of the composite stiffening member to be co-cure bonded in integral combination with the composite article.

The second set of steps includes a step of laying up a first set of prepreg composite plies that define at least the OML composite skin in combination with a fabrication mold, a step of laying up the modified honeycomb core in combination with the layed-up first prepreg composite plies in the fabrication mold, a step of laying up additional prepreg composite plies that define the IML composite skin and the composite stiffening member in combination with the modified honeycomb core in the fabrication mold, a step of preparing the layed-up fabrication mold for co-curing, and a step of co-curing the layed-up fabrication mold to form the composite article having the composite stiffening member co-cure bonded in integral combination therewith.

The additional prepreg composite plies lay-up step may further comprise a step of laying up a second set of prepreg composite plies that define the IML composite skin in combination with the modified honeycomb core in the fabrication mold and a step of laying up a third set of prepreg composite plies that define the composite stiffening member in combination with the external surface of the detail mandrel of the modified honeycomb core.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODE FOR CARRYING OUT THE INVENTION

Figure 1A:
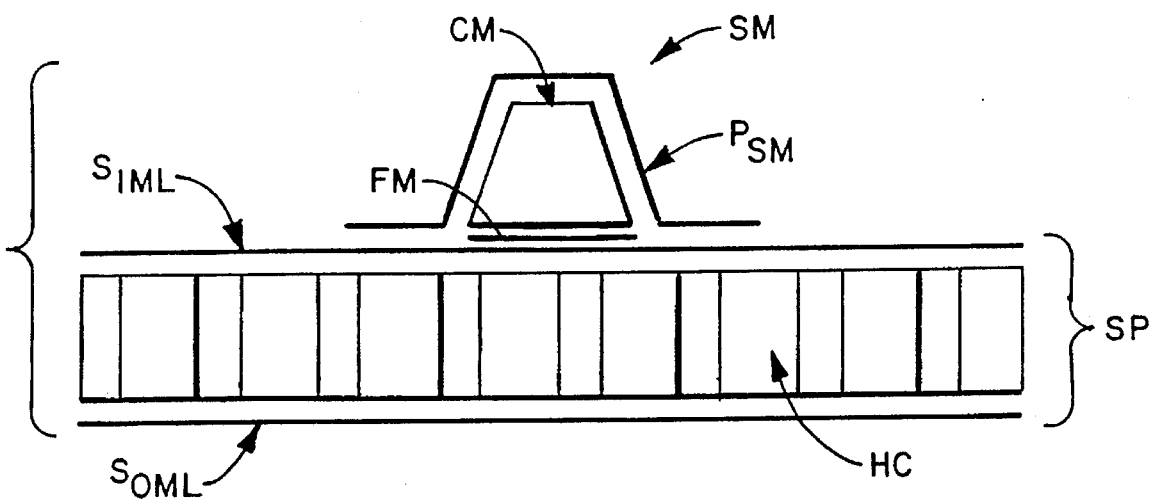
FIG. 1A illustrates a prior art co-cure bonding method for bonding a composite stiffening member in combination with a composite structural panel.
Figure 1B:
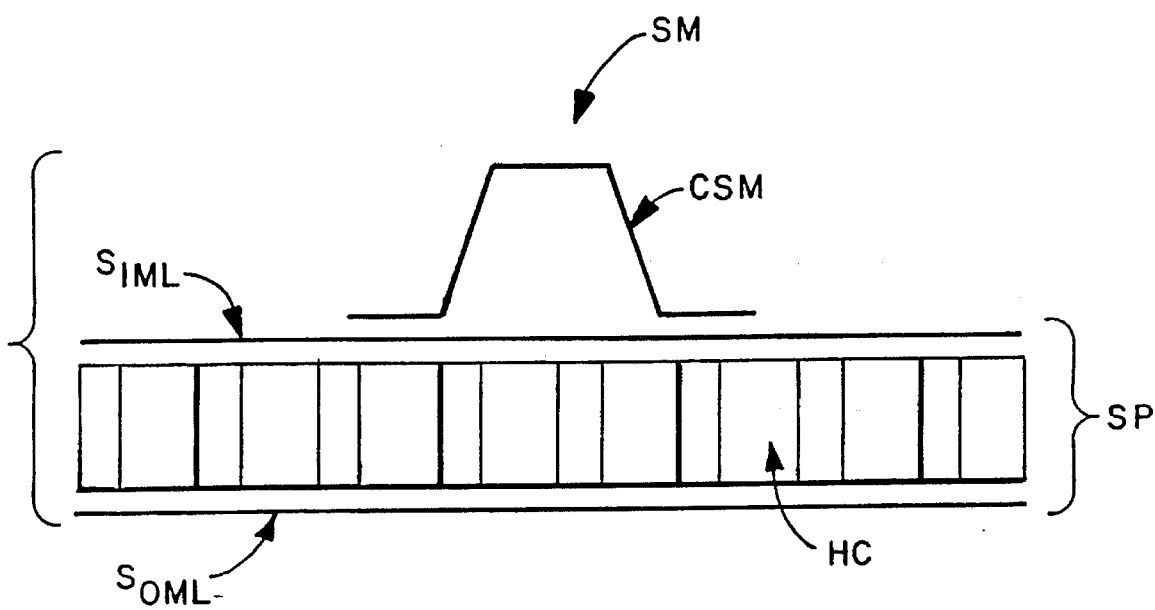
FIG. 1B illustrates a prior art secondary bonding method for bonding a composite stiffening member in combination with a composite structural panel.
Figure 2:
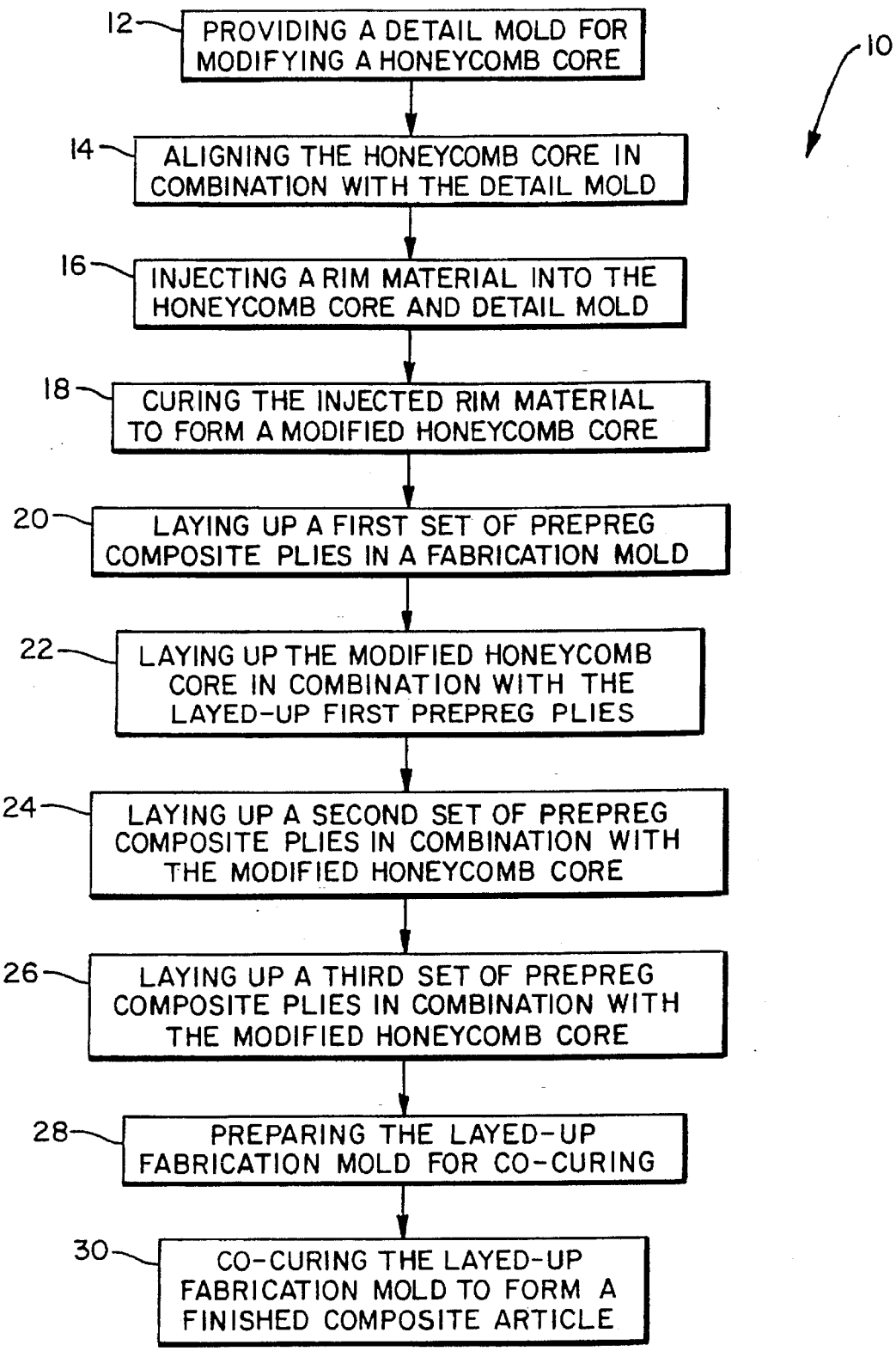
FIG. 2 illustrates the steps of a method according to the present invention for fabricating a composite article having a composite stiffening member co-cure bonded in integral combination therewith.

Referring now to the drawings wherein like reference numerals illustrate corresponding or similar elements throughout the several views, FIG. 2 illustrates the steps of a method 10 according to the present invention for fabricating a composite article having a composite stiffening member co-cure bonded in integral combination therewith. The method 10 according to the present invention has utility for fabricating composite articles that comprise an outer mold line (OML) composite skin and an inner mold line (IML) composite skin having a honeycomb core interposed therebetween, e.g., composite structural panels for the fuselages of aircraft and helicopters. The method 10 according to the present invention is described herein in terms of fabricating a composite structural panel comprising an OML composite skin and an IML composite skin having a modified honeycomb core interposed therebetween, and wherein the composite stiffening member is co-cure bonded in integral combination with the IML surface of the IML composite skin. One skilled in the art will appreciate, however, that the described embodiment of the method 10 according to the present invention in terms of the fabrication of a composite structural panel is not intended to be limiting, but is merely intended to facilitate a fuller and more precise understanding of the method 10 according to the present invention.

The method 10 according to the present invention is advantageous inasmuch as a lightweight detail mandrel, which defines the IML surface of the composite stiffening member to be co-cure bonded in integral combination with the composite article, is integrally formed as part of the honeycomb core of the composite article to be fabricated. The integral detail mandrel is operative to ensure precise alignment of the composite stiffening member to be integrally co-cure bonded in combination with the composite article. The integral detail mandrel is further operative as a pressure reactive member to stabilize the composite stiffening member against the co-cure pressure exerted during the co-cure cycle of the method 10, i.e., to prevent collapse or deformation of the composite stiffening member. In addition, the formation of the detail mandrel as part of the honeycomb core results in the stabilization of the honeycomb core, thereby reducing any tendency for the honeycomb core to collapse or deform as a result of the co-cure pressure exerted during the co-cure cycle of the method 10.

The method 10 of the present invention includes a first set of steps that are directed to fabricating a detail mandrel as an integral element of the honeycomb core of the composite article to be fabricated, i.e., modifying the honeycomb core, and a second set of steps directed to fabrication of the composite article utilizing the honeycomb core as modified in the first set of steps. The first set of steps includes a step 12 of providing a detail mold for modification of the honeycomb core of the composite article to be fabricated, a step 14 of aligning the honeycomb core in combination with the detail mold, a step 16 of injecting a reaction injection molding (RIM) foam into the detail mold, and a step 18 of curing the injected RIM foam to form the modified honeycomb core that includes the detail mandrel as an integral part thereof. The modified honeycomb core is removed from the detail mold and utilized to fabricate the composite article in the second set of steps as described hereinbelow in further detail.

Figure 3:
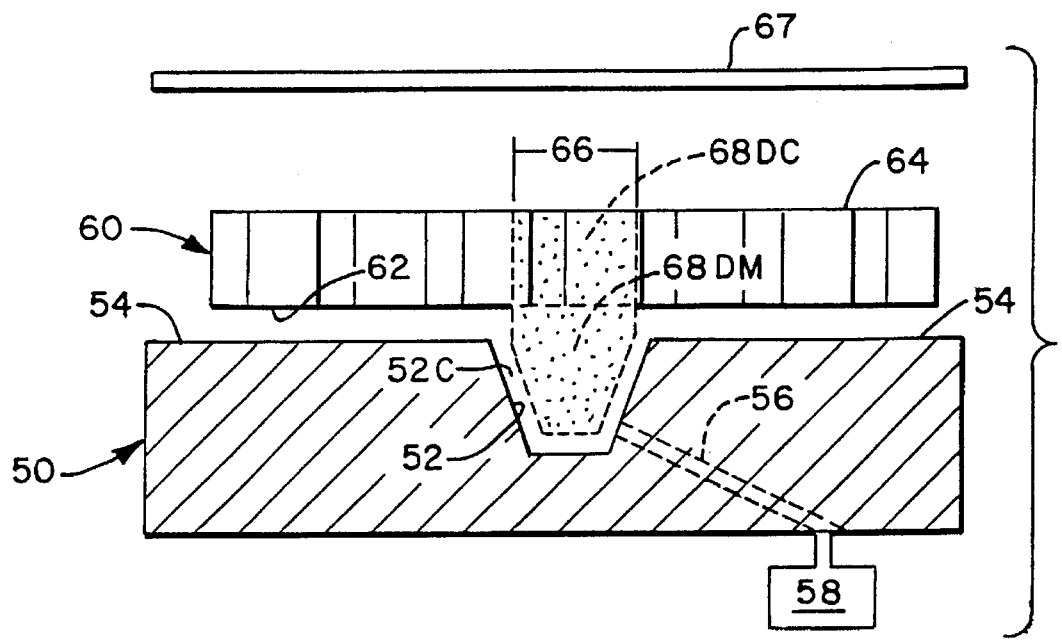
FIG. 3 illustrates a detail mold for use with the method according to the present invention wherein a detail mandrel is formed in integral combination with the honeycomb core of the composite article to be fabricated to form a modified honeycomb core.

In step 12, a detail mold 50 is provided that includes a detail molding surface 52, a core engagement surface 54, and an injection channel 56 as illustrated in FIG. 3. The detail molding surface 52 has a configuration that defines the external surface of the detail mandrel to be formed (as exemplarily illustrated in FIG. 3 a truncated configuration) and further defines a detail cavity 52C in the detail mold 50. The detail cavity 52C is formed in the detail mold 50 to correspond to the precise position of the composite stiffening member in relation to the honeycomb core of the composite structural panel to be fabricated. The core engagement surface 54 has a configuration that is complementary to a first surface 62 of the honeycomb core 60 of the composite structural panel to be fabricated. The injection channel 56 provides a fluid communication channel between a reaction injection molding (RIM) apparatus 58 and the detail cavity 52C defined by the detail molding surface 52.

In step 14, the honeycomb core 60 (e.g., an aramid paper core having a cellular configuration that is impregnated with a phenolic based resin—of the type marketed by Hexcel Corp., Chatsworth, Calif. or Ciba-Geigy Corp., Greensboro, N.C.) is aligned in combination with the detail mold 50 by abuttingly engaging the first surface 62 of the core 60 with the core engagement surface 54. The abutting engagement between the first surface 62 and the core engagement surface 54 ensures that a base segment 66 (see FIG. 3) of the honeycomb core 60, i.e., the segment that defines the precise position of the composite stiffening member with respect to the honeycomb core 60, is aligned with the detail cavity 52 of the detail mold 50. As illustrated in FIG. 3, the first surface 62 of the honeycomb core 60 and the complementary core engagement surface 54 have planar configurations. One skilled in the art will appreciate that these surfaces may be other than planar configurations, i.e., complex configurations, depending upon the particular application, i.e., the composite article to be fabricated. The first and second surfaces 62, 64 of the honeycomb core 60 define the configuration of the composite structural panel to be fabricated. Once the honeycomb core 60 is engaged with the detail mold 50, a retention plate 67 is preferably engaged with the second surface 64 of the honeycomb core 60 and operative to retain the honeycomb core 60 in position on the detail mold 50.

In step 16, the RIM apparatus 58 is activated to inject a RIM foam through the injection channel 56 to fill the detail cavity 52C and the base segment 66 of the honeycomb core 60. The retention plate 67 is further operative during injection of the RIM foam to ensure that the RIM foam does not spill over into other cells of the honeycomb core 60 during the RIM injection step 16. The injected RIM foam is preferably a two-part reactive foam that is mixed and catalyzed in the RIM apparatus 58 to form a reacted polymeric foam in the detail cavity 52 and the honeycomb cells of the base segment 66 of the honeycomb core 60. The hardened polymeric foam preferably has a density in the hardened state in the range of about 8 lb/ft$^3$ to about 12 lb/ft$^3$ and is refractory, i.e., unaffected, with respect to the elevated temperatures of co-cure cycle of the method 10 described hereinbelow in further detail (in contrast, a conventional rigid foam such as a polyurethane foam would be adversely affected, i.e., subject to structural breakdown, at the elevated temperatures of the co-cure cycle of the method 10). With respect to the described embodiment of the method 10, the two-part foam comprises polyol and a polymer isocyanate (available from Dow Chemical, Midland, Mich. as XUS-15314.00L and PAP-580N, respectively) which are mixed and catalyzed during injection into the detail cavity 52C and honeycomb cells of the base segment 66 by means of the RIM apparatus 58 to form a polycyanoacrylate foam. The polycyanoacrylate foam is an expandible foam, thereby ensuring that the entire detail cavity 52C and all of the honeycomb cells of the base segment 66 are filled with the injected RIM foam. In using such an expandable foam, the polycyanoacrylate foam is injected to fill about 10–20% of the volume of the detail cavity 52C; the ensuing expansion of the injected two-part reactive foam causes the detail cavity 52C and all of the honeycomb cells of the base segment 66 to be filled with the injected polycyanoacrylate foam.

In step 18, the expanded RIM foam filling the detail cavity 52C and the honeycomb cells of the base segment 66 is cured. Where the injected RIM foam is the polycyanoacrylate foam described in the preceding paragraph, the expanded two-part foam material is subjected to an elevated temperature, e.g., about 150° F., for a predetermined cure period, e.g., about 10 minutes, to cure the expanded two-part foam material to form a modified honeycomb core 70 (see FIG. 4). The modified honeycomb core 70 includes a densified base segment 68DC and a detail mandrel 68DM integral with the densified base segment 68DC. The densified base segment 68DC comprises the honeycomb cells of the base segment 66 that are filled with hardened RIM foam. The detail mandrel 68DM comprises the hardened RIM foam of the detail cavity 52C. The hardened RIM foam comprising the detail mandrel 68DM is continuous with the hardened RIM foam comprising the densified base segment 68DC such that the densified base segment 68DM provides a mechanical interlock that maintains the detail mandrel 68DM precisely positioned with respect to the modified honeycomb core 70. The external surface 68ES of the detail mandrel 68DM defines the IML surface of the composite stiffening member to be co-cure bonded in integral combination with the composite article to be fabricated as discussed in further detail hereinbelow. Since the detail mandrel 68DM projects outwardly from what was the first surface 62 of the honeycomb core 60, i.e., the first surface 62 has been disrupted, new layup surfaces 72 are defined for the modified honeycomb core 70. The layup surfaces 72 of the modified honeycomb core 70 define the IML surface of the composite structural panel to be fabricated.

As part of step 18, the modified honeycomb core 70 is removed from the detail mold 50 by first removing the retention plate 67 and then removing the modified honeycomb core 70. To facilitate removal of the modified honeycomb core 70, the detail molding surface 52 and the core engagement surface 54 of the detail mold 50 may be sprayed with a conventional mold release agent prior to step 14. After removal of the modified honeycomb core 70 from the detail mold 50, any excess hardened RIM foam is removed from the second surface 64, the layup surfaces 72, and/or the densified base segment 68DC of the modified honeycomb core 70, as required.

The second set of steps are directed to fabricating the composite structural panel utilizing the modified honeycomb core 70 described in the preceding paragraphs, and include a step 20 of laying up a first set of prepreg composite plies in a fabrication mold, a step 22 of positioning the modified honeycomb core 70 in combination with the layed-up prepreg composite plies in the fabrication mold, a step 24 of laying up a second set of prepreg composite plies in combination with the modified honeycomb core 70, an optional step 26 of laying up a third set of prepreg composite plies in combination with the detail mandrel 68DM of the modified honeycomb core 70, a step 28 of preparing the layed-up fabrication mold for curing, and a step 30 of curing the layed-up fabrication mold to form the composite article having an integrally bonded composite stiffening member.

In step 20, a fabrication mold 80 is provided that includes a molding surface 82, positioning surfaces 84, and mold edge surfaces 86. The molding surface 82 defines the OML surface of the composite structural panel to be manufactured. The positioning surfaces 84 are operative to properly position the lay-up of composite plies and the modified honeycomb core 70 in combination with the fabrication mold 80. The positioning surfaces 84 may also be operative to define part of the OML surface of the composite article to be manufactured, depending upon the configurational complexity of the composite article to be manufactured.

The method 10 according to the present invention utilizes prepreg composite plies to form the OML surface(s), the IML surface(s) and the composite stiffening member of the composite structural panel to be fabricated utilizing the described embodiment of the method 10 according to the present invention. Composite prepregs are formed from woven fibrous cloth, yarn, or fiber tow comprised of a matrix of orientated fibrous material such as graphite, aramids (e.g., KEVLAR® (KEVLAR is a registered trademark of E. I. du Pont de Nemours & Co., Wilmington, DE for an aromatic polyamide fiber of high tensile strength)), boron, fiberglass, or the like which is impregnated with a predetermined amount of epoxy, phenolic, or other similar organic resinous material. The organic resin impregnated composite material is staged to form "tacky" prepreg composite laminates which may be cut to the net shape of the OML composite skin, the IML composite skin, and/or the composite stiffening member of the composite structural panel to be fabricated, i.e., prepreg composite plies. A first set of prepreg composite plies 90, which define at least the OML composite skin of the composite structural panel to be fabricated, is layed-up in combination with the molding surface 82 of the fabrication mold 80 in step 20. The positioning ends 84 are operative to ensure that the first prepreg composite plies 90 are properly positioned with respect to the molding surface 82. Depending upon the configuration and/or complexity of the composite article to be fabricated, the layed-up first prepreg composite plies, in addition to defining the OML composite surface of the composite article to be fabricated, may define the composite stiffening member that is co-cure bonded in integral combination with the composite article (see disclosure hereinbelow with respect to FIGS. 5A–5B). For the described embodiment of the method 10 according to the present invention wherein a composite structural panel is fabricated, the layed-up first prepreg composite plies 90 define only the OML composite skin of the composite structural panel to be fabricated.

Figure 4:
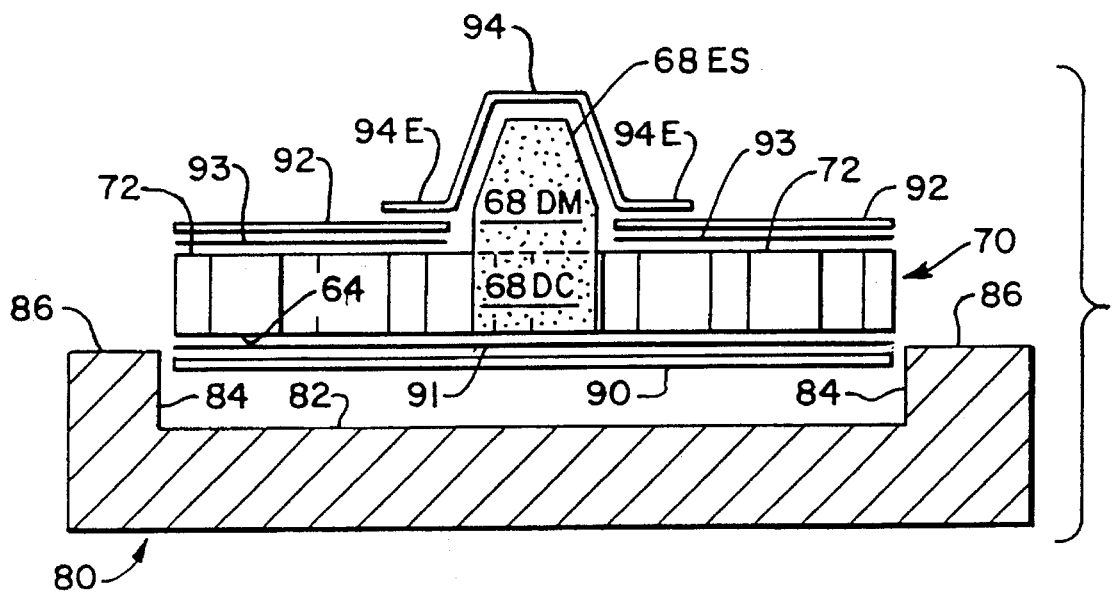
FIG. 4 illustrates a fabrication mold for use with the method according to the present invention for fabricating the composite article utilizing the modified honeycomb core.

In step 22 the modified honeycomb core 70 is layed-up in combination with the first prepreg composite plies 90 in the fabrication mold 80 by disposing the second surface 64 of the core 70 in abutting engagement with the first prepreg composite plies 90. The positioning ends 84 may be used to ensure that the modified honeycomb core 70 is properly positioned with respect to the first prepreg composite plies 90. To ensure that the modified honeycomb core 70 remains properly positioned vis-a-vis the first prepreg composite plies 90, a film adhesive 91, e.g., an epoxy film adhesive such as HY-SOL b 9690 that has an areal weight of 0.03 lb/ft$^2$, is preferably interposed between the layed-up first prepreg composite plies 90 and the second surface 64 of the modified honeycomb core 70. As illustrated in FIG. 4, the film adhesive 91 forms a continuous layer between the layed-up first prepreg composite plies 90 and the second surface 64. It will be appreciated, however, that the film adhesive 91 may alternatively comprise strips of film adhesive interposed between the layed-up composite plies 90 and the second surface 64, i.e., the film adhesive comprises a plurality of discontinuous film adhesive strips.

In step 24 a second set of prepreg composite plies 92, which define at least the IML composite skin of the composite structural panel to be fabricated, is layed-up in combination with the layup surfaces 72 of the modified honeycomb core 70. The layup surfaces 72 of the modified honeycomb core 70 define the IML surface configuration of the IML composite skin of the composite structural panel to be fabricated. To ensure that proper positioning is maintained between the layed-up second prepreg composite plies 92 and the first surfaces 72 of the modified honeycomb core 70, a film adhesive 93 of the type described hereinabove is preferably interposed between the first surfaces 72 of the modified honeycomb core 70 and the second prepreg composite plies 92.

Depending upon the configuration and complexity of the composite article to be fabricated, the second prepreg composite plies may be layed-up in combination with the modified honeycomb core 70 to define all or a portion of the composite stiffening member as well as the IML composite skin of the composite article to be fabricated. With respect to the described embodiment of the method 10 according to the present invention for fabricating a composite structural panel, the second prepreg composite plies 92 may be layed-up in step 24 in combination with the lay-up surfaces 72 and the external surface 68ES of the detail mandrel 68DM of the modified honeycomb core 70 so that the layed-up second prepreg composite plies 92 simultaneously define the IML composite skin and the composite stiffening member of the composite structural panel to be fabricated. However, due to the possibility of wrinkling occurring in the layed-up second prepreg composite plies 92 that define both the IML composite skin and the composite stiffening member, it is preferable to lay up the second prepreg composite plies 92 in step 24 to define only the IML composite skin and to lay up an additional set of prepreg composite plies to define the composite stiffening member.

Therefore, in optional step 26 a third set of prepreg composite plies 94, which define the composite stiffening member of the composite structural panel to be fabricated, is layed-up in combination with the layed-up second composite plies 92 and the external surface 68ES of the detail mandrel 68DM of the modified honeycomb core 70. As disclosed hereinabove, the external surface 68ES of the detail mandrel 68DM defines the surface configuration of the composite stiffening member. Inasmuch as the ends 94E of the third prepreg composite plies 94 are layed-up in abutting engagement with the layed-up second prepreg composite plies 92, and inasmuch as the second and third prepreg composite plies 92, 94 have "tacky" surfaces, a film adhesive is not required to ensure that the third prepreg composite plies 94 are maintained in proper position vis-a-vis the layed-up second prepreg composite plies 92. Instead, the inherent tackiness of second and third prepreg composite plies 92, 94 is utilized to ensure the maintenance of proper positioning between the layed-up second prepreg composite plies 92 and the layed-up third prepreg composite plies 94.

In step 28 the layed-up fabrication mold 80 is prepared for the co-curing cycle of the method 10. The method 10 according to the present invention preferably utilizes a conventional vacuum bag technique to prepare the layed-up fabrication mold 80 for the co-curing cycle. A conventional vacuum bag (not shown) is disposed in combination with layed-up fabrication mold 80, either by inserting the entire layed-up fabrication mold 80 into the vacuum bag and sealing the vacuum bag, or by draping the vacuum bag over the layed-up fabrication mold 80 and sealing the edges of the vacuum bag to the mold edge surfaces 86 of the fabrication mold 80.

In step 30 the vacuum-bagged fabrication mold 80 is inserted into an autoclave (not shown) and subjected to a co-cure cycle to form the composite structural panel having a composite stiffening member co-cure bonded in integral combination therewith. In the co-cure cycle, a vacuum is first drawn in the vacuum-bagged fabrication mold 80, and the vacuum-bagged fabrication mold 80 is then subjected to heat and pressure to cure the first, second, and/or third prepreg composite plies 90, 92, 94 to form the composite structural panel having the composite stiffening member co-cure bonded in integral combination therewith. The specific heat and pressure to which the vacuum-bagged fabrication mold 80 is subjected depends, inter alia, upon the characteristics of the prepreg composite plies that have been layed-up to form the composite structural panel and the integral composite stiffening member. For the described embodiment of the method 10, the co-cure temperature would be about 350° F. and a co-cure pressure would be about 25 psi for the step 30 co-cure cycle. Upon completion of the co-cure cycle, the fabrication mold 80 is separated from the vacuum bag, and the composite structural panel having the composite stiffening member co-cure bonded in integral combination therewith is removed from the fabrication mold 80. To facilitate removal of the finished composite structural panel from the fabrication mold 80, the molding surface 82 and the positioning ends 84 of the fabrication mold 80 may be sprayed with a conventional mold release agent, as required, prior to laying up the first prepreg composite plies 90 in step 20.

The detail mandrel 68DM of the modified honeycomb core 70 functions as a pressure reactive member during the co-cure cycle to maintain the structural integrity of the prepreg composite plies defining the composite stiffening member, i.e., to prevent collapse or deformation of the composite stiffening member during the co-cure cycle. In addition, the densified base segment 68DC of the modified honeycomb core 70 functions to stabilize the modified honeycomb core 70 during the co-cure cycle, precluding collapse or deformation of the modified honeycomb core 70 as a result of the co-cure pressure exerted on the vacuum-bagged fabrication mold 80.

Figure 5A:
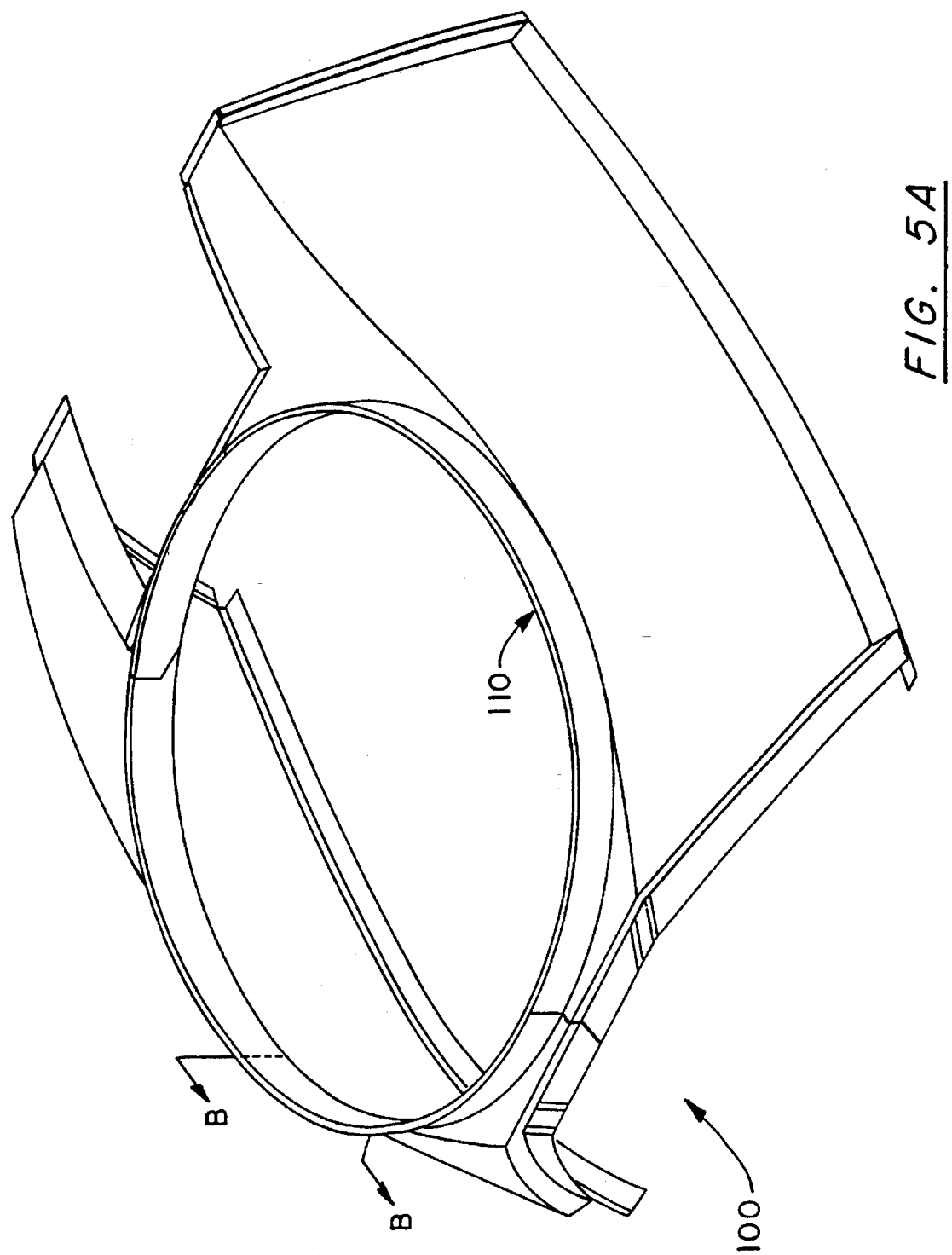
FIG. 5A is a perspective view of the composite upper pylon of the RAH-66 Comanche helicopter that may be fabricated utilizing the method according to the present invention.
Figure 5B:
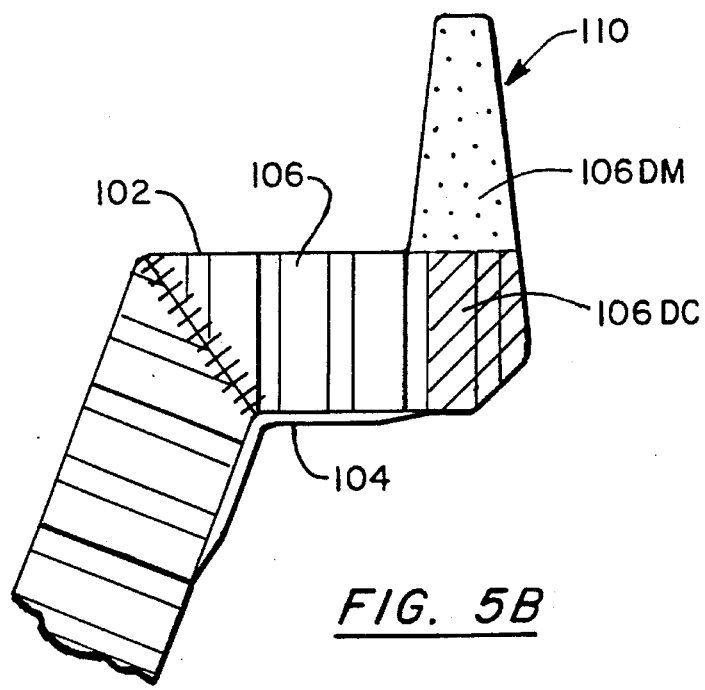
FIG. 5B is a partial cross-sectional view of the composite upper pylon of FIG. 5A taken along line B-B thereof illustrating the composite stiffening collar that is co-cure bonded in integral combination with the composite upper pylon.
Figure 5C:
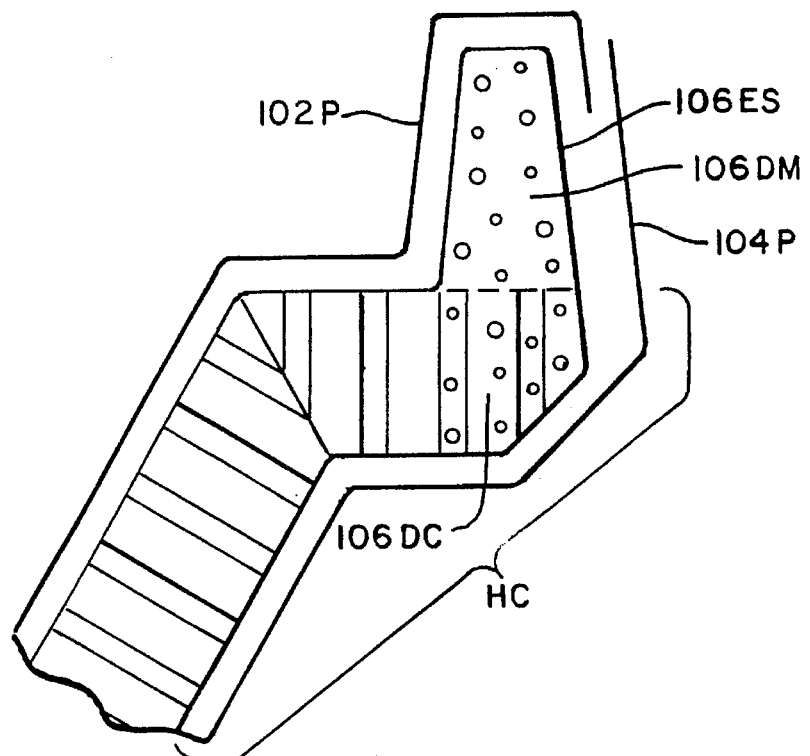
FIG. 5C is a partial cross-sectional view of the composite upper pylon illustrating generally the fabrication thereof utilizing the method according to the present invention.

Another application for the method 10 according to the present invention is illustrated in FIGS. 5A–5C. FIG. 5A illustrates the upper pylon 100 of the RAH-66 Comanche helicopter fabricated by the assignee of the instant application. The upper pylon 100 is fabricated as a composite article that includes an OML composite skin 102, an IML composite skin 104, and a modified honeycomb core 106 interposed between the OML composite skin 102 and the IML composite skin 104 as illustrated in FIG. 5B. The upper pylon 100 includes a stiffening collar 110 that is co-cure bonded in integral combination with the upper pylon 100 utilizing the method 10 according to the present invention.

With reference to FIG. 5C, steps 12–18 described hereinabove of the method 10 according to the present invention are utilized to modify the honeycomb core HC of the upper pylon 100 to include a densified base segment 106DC and a detail mandrel 106DM integral with the densified base segment 106DC. The external surface 106ES of the detail mandrel 106DM defines the IML surface of the composite collar 110 to be co-cure bonded in integral combination with the upper pylon 100. Steps 20–24 and 28–30 described hereinabove of the method 10 according to the present invention are utilized to fabricate the upper pylon 100 having the composite stiffening collar 110 co-cure bonded in integral combination therewith. A first set of prepreg composite plies 102P that define the OML composite skin 102 of the upper pylon 100 and a portion of the composite stiffening collar 110 and a second set of second prepreg composite plies 104P that define the IML composite skin 100 of the upper pylon 104 and the other portion of the composite stiffening collar 110 are layed-up in combination with the modified honeycomb core 106. Due to the particular configuration of the composite stiffening collar 110 and its structural relation to the upper pylon 100, the first and second prepreg composite plies 102P, 104P are layed-up in combination with the external surface 106ES of the detail mandrel 106DM of the modified honeycomb core 106 to define the composite stiffening collar 110 of the upper pylon 100.

A variety of modifications and variations of the present invention are possible in light of the above teachings. For example, the RIM foam described hereinabove may comprise a reticulated foam that is treated with a resin-graphite particulate solution to enhance the lower observability characteristics, i.e., lower dielectric constant, of the finished composite article. It is therefore to be understood that, within the scope of the appended claims, the present invention may be practiced otherwise than as specifically described hereinabove.

What is claimed is:

1. A method for fabricating a composite article having a composite stiffening member co-cure bonded in integral combination therewith, the composite article including an OML composite skin, an IML composite skin, and a honeycomb core interposed between the OML composite skin and the IML composite skin, said method comprising the steps of:

providing a detail mold having a detail molding surface that defines a detail cavity and a core engagement surface;

aligning a honeycomb core having first and second surfaces with the detail mold by abuttingly engaging the first surface of the honeycomb core with the core engagement surface of the detail mold wherein a base segment of the honeycomb core is aligned with the detail cavity of the detail mold;

activating a reaction injection molding (RIM) apparatus to inject a RIM foam to fill the detail cavity of the detail mold and the honeycomb cells of the base segment of the honeycomb core;

curing the injected RIM foam to form a modified honeycomb core having a densified base segment and a detail mandrel integral with the densified base segment;

laying up a first set of prepreg composite plies that define at least the OML composite skin in combination with a fabrication mold;

laying up the modified honeycomb core in combination with the layed-up first prepreg composite plies in the fabrication mold;

laying up additional prepreg composite plies that define the IML composite skin and the composite stiffening member in combination with the modified honeycomb core in the fabrication mold;

preparing the fabrication mold for co-curing; and co-curing said first prepreg composite plies and said additional prepreg composite plies to form the composite article having the composite stiffening member co-cure bonded in integral combination therewith.

2. The method of claim 1 wherein said step of laying up additional prepreg composite plies further comprises the steps of:

laying up a second set of prepreg composite plies that define the IML composite skin in combination with the modified honeycomb core in the fabrication mold; and laying up a third set of prepreg composite plies that define the composite stiffening member in combination with the detail mandrel of the modified honeycomb core in the fabrication mold.

3. The method of claim 2 further comprising the step of interposing a film adhesive between the modified honeycomb core and the second prepreg composite plies in the fabrication mold.

4. The method of claim 1 further comprising the step of interposing a film adhesive between the first prepreg composite plies and the modified honeycomb core.

5. The method of claim 1 further comprising the step of engaging a retention plate with the second surface of the honeycomb core aligned in the detail mold.

6. A method for fabricating a composite article having a composite stiffening member co-cure bonded in integral combination therewith, the composite article including an OML composite skin, an IML composite skin, and a honeycomb core interposed between the OML composite skin and the IML composite skin, said method comprising the steps of:

providing a detail mold having a detail molding surface that defines a detail cavity, a core engagement surface and an injection channel;

aligning a honeycomb core having first and second surfaces with the detail mold by abuttingly engaging the first surface of the honeycomb core with the core engagement surface of the detail mold wherein a base segment of the honeycomb core is aligned with the detail cavity of the detail mold;

activating a reaction injection molding (RIM) apparatus fluidically interconnected to the injection channel to inject a RIM foam to fill the detail cavity of the detail mold and the honeycomb cells of the base segment of the honeycomb core;

curing the injected RIM foam to form a modified honeycomb core having a densified base segment and a detail mandrel integral with the densified base segment;

laying up a first set of prepreg composite plies that define the OML composite skin in combination with a fabrication mold;

laying up the modified honeycomb core in combination with the layed-up first prepreg composite plies in the fabrication mold;

laying up a second set of prepreg composite plies that define the IML composite skin in combination with the modified honeycomb core in the fabrication mold;

laying up a third set of prepreg composite plies that define the composite stiffening member in combination with the detail mandrel of the modified honeycomb core in the fabrication mold;

preparing the fabrication mold for co-curing; and co-curing said first, second and third sets of prepreg composite plies to form the composite article having the composite stiffening member co-cure bonded in integral combination therewith.

7. The method of claim 6 further comprising the step of interposing a film adhesive between the modified honeycomb core and the second prepreg composite plies in the fabrication mold.

8. The method of claim 6 further comprising the step of interposing a film adhesive between the first prepreg composite plies and the modified honeycomb core.

9. The method of claim 6 further comprising the step of engaging a retention plate with the second surface of the honeycomb core aligned in the detail mold.

* * * * *